(12) United States Patent
Howell

(10) Patent No.: US 7,699,179 B2
(45) Date of Patent: Apr. 20, 2010

(54) RETENTION DEVICE FOR FILTER SCREEN

(75) Inventor: Marcus Willoughby Howell, New South Wales (AU)

(73) Assignee: Symphony Wire Pty Ltd., New South Wales (AU)

( * ) Notice: Subject to any disclaimer, the term of this patent is extended or adjusted under 35 U.S.C. 154(b) by 1122 days.

(21) Appl. No.: 11/234,772

(22) Filed: Sep. 23, 2005

(65) Prior Publication Data

US 2006/0288868 A1 Dec. 28, 2006

(30) Foreign Application Priority Data

Jun. 27, 2005 (AU) .............................. 2005202795

(51) Int. Cl.
*B01D 29/07* (2006.01)
(52) U.S. Cl. ................. 210/384; 210/499; 210/388; 209/313; 209/399; 209/405; 209/408; 209/413
(58) Field of Classification Search ................ 210/384, 210/499; 209/313, 399, 405, 408, 413
See application file for complete search history.

(56) References Cited

U.S. PATENT DOCUMENTS

| 5,392,925 | A | * | 2/1995 | Seyffert | 209/405 |
| 5,417,858 | A | * | 5/1995 | Derrick et al. | 210/388 |
| 5,417,859 | A | * | 5/1995 | Bakula | 210/388 |
| 5,551,575 | A | * | 9/1996 | Leone | 209/273 |
| 5,690,826 | A | * | 11/1997 | Cravello | 210/384 |
| 7,198,156 | B2 | * | 4/2007 | Schulte et al. | 209/309 |
| 2002/0000399 | A1 | * | 1/2002 | Winkler et al. | 209/399 |
| 2007/0199449 | A1 | * | 8/2007 | Wiser et al. | 96/69 |

FOREIGN PATENT DOCUMENTS

JP 7195034 8/1995

* cited by examiner

*Primary Examiner*—Duane Smith
*Assistant Examiner*—Minh-Chau T Pham
(74) *Attorney, Agent, or Firm*—King & Schickli, PLLC

(57) ABSTRACT

A retention device for use with a filter apparatus having a main frame and an intermediate frame member, and a plurality of parallel filter elements in a filter zone being spaced one from another at a selected distance and forming a filter screen known as a harp screen, is disclosed. The filter screen is mounted to the main frame. The retention device includes a clamp disposed at an intermediate portion of the filter elements for clamping at least a clamped portion of the filter elements to the intermediate frame member, with the arrangement being such that a neutral region is provided adjacent or within the clamped portion of the filter elements, the neutral region being such that the filter elements may be manipulated within that region, and their relative spacing varied, within that region, without affecting spacing between filter elements outside the neutral region.

17 Claims, 6 Drawing Sheets

RETENTION DEVICE FOR FILTER SCREEN

FIELD OF THE INVENTION

The present invention relates generally to retention devices for filter screens, in particular for use with harp screens where screen filter elements are all parallel with one another.

BACKGROUND TO THE INVENTION

At present, filter screens, particularly harp screens, are loaded into vibrating filter machines and tensioned so as to assist in maintaining constant spacing between adjacent filter elements. The screens are formed into a slight arch, which also assists in filtration, however, filtered material tends to gather at edges of the screen. There is no known method of reducing buildup at screen edges; maintaining or improving efficiency of filtration, and/or maintaining screen element spacing at intermediate portions of the screen, without undue adding of tension to the screen elements.

The present invention seeks to ameliorate one or more of the abovementioned disadvantages.

SUMMARY OF THE INVENTION

According to one aspect of the present invention there is provided a retention means for use with a filter apparatus, the filter apparatus having a main frame and an intermediate frame member, a plurality of filter elements forming a filter screen, and mounted to the main frame, the retention means including: a clamp in use disposed at an intermediate portion of the filter elements for clamping at least a portion of the filter elements to the intermediate frame member.

In one arrangement of the filter apparatus, the filter elements are parallel with one another and spaced apart at selected distances to form what is known as a harp screen. The elements may run transverse to or parallel to the flow of material to be filtered or screened.

Preferably a neutral region is provided, within which the filter elements may be manipulated and their relative spacing varied, without affecting the spacing outside the neutral region.

Preferably the neutral region is provided by spaced-apart clamping zones or spaced-apart comb zones.

Preferably the clamp includes an elongate clamping element disposed perpendicular to the filter elements and in the plane of the screen in order to clamp a short region of each filter element at an intermediate region.

Preferably, one or more combs are operatively connected to the clamp for spacing adjacent filter elements apart from one another at a selected distance, the or each comb mounted on the clamp element at one or more comb mounting regions.

Preferably, the or each comb element includes a plurality of receiving apertures between adjacent comb teeth, each aperture for receiving a portion of each filter element.

In one form, the or each comb element includes a filter element retaining device for retaining the received portion of each filter element.

Preferably, the or each comb element includes one or more bights, in which the filter element retaining device is disposed in use.

In preferred embodiments the or each bight is transversely disposed across each comb tooth, the or each bight essentially in the form of a through aperture adjacent the end of each comb tooth and parallel with a longitudinal axis of the comb element.

In a preferred embodiment, each comb tooth includes a flat sheet of steel or suitable plastic, folded so as to provide a bight, and the comb tooth is connected to and retained by a comb trunk. Preferably the teeth and comb trunk are integral.

Preferably the filter elements pass through the neutral region and under the clamping element when installed. In one form the retention to the intermediate frame member is achieved by one or more fasteners, which are preferably threaded bolts and nuts passing through holes in the clamp elements.

To assemble, the filter elements are moved aside in the neutral region to allow the bolt to pass through the clamp element and into the intermediate frame member without affecting the spacing between filter elements outside the neutral region.

Comb mounting is provided by a comb clamp mounted on a side face of the clamp element, the comb clamp including a broad flat plate element with through apertures for receiving a fastener. The plate element holds the comb trunk against the side face of the clamp element so that the comb teeth extend when installed into and past the plane of the filter elements or screen. The comb tooth bight or aperture when assembled is disposed on an underside of the filter screen.

In use, the filter elements are gripped in end mounts at their ends, the end mounts being mounted onto the main frame of a vibrating filter machine and held taut.

Viewed in side elevation before the retention device is installed, the screen is formed into a slight bow or arch due to elevated comb supports at intermediate locations. Once the retaining means is installed, a double arch is formed which improves distribution of filtered material across the screen, hence improving efficiency of filtration and screening.

The clamp element may be in a suitable form, but in preferred embodiments, the clamp is a channel or boxed section having spaced apart walls to provide clamp mounting regions thereon. The fastening bolts pass through a base wall which holds the filter screen against an upper wall of the intermediate frame member.

DESCRIPTION OF THE PREFERRED EMBODIMENTS

In order to enable a clearer understanding, the invention will hereinafter be described with reference to drawings and description of preferred embodiments. In the drawings.

Figure 1:
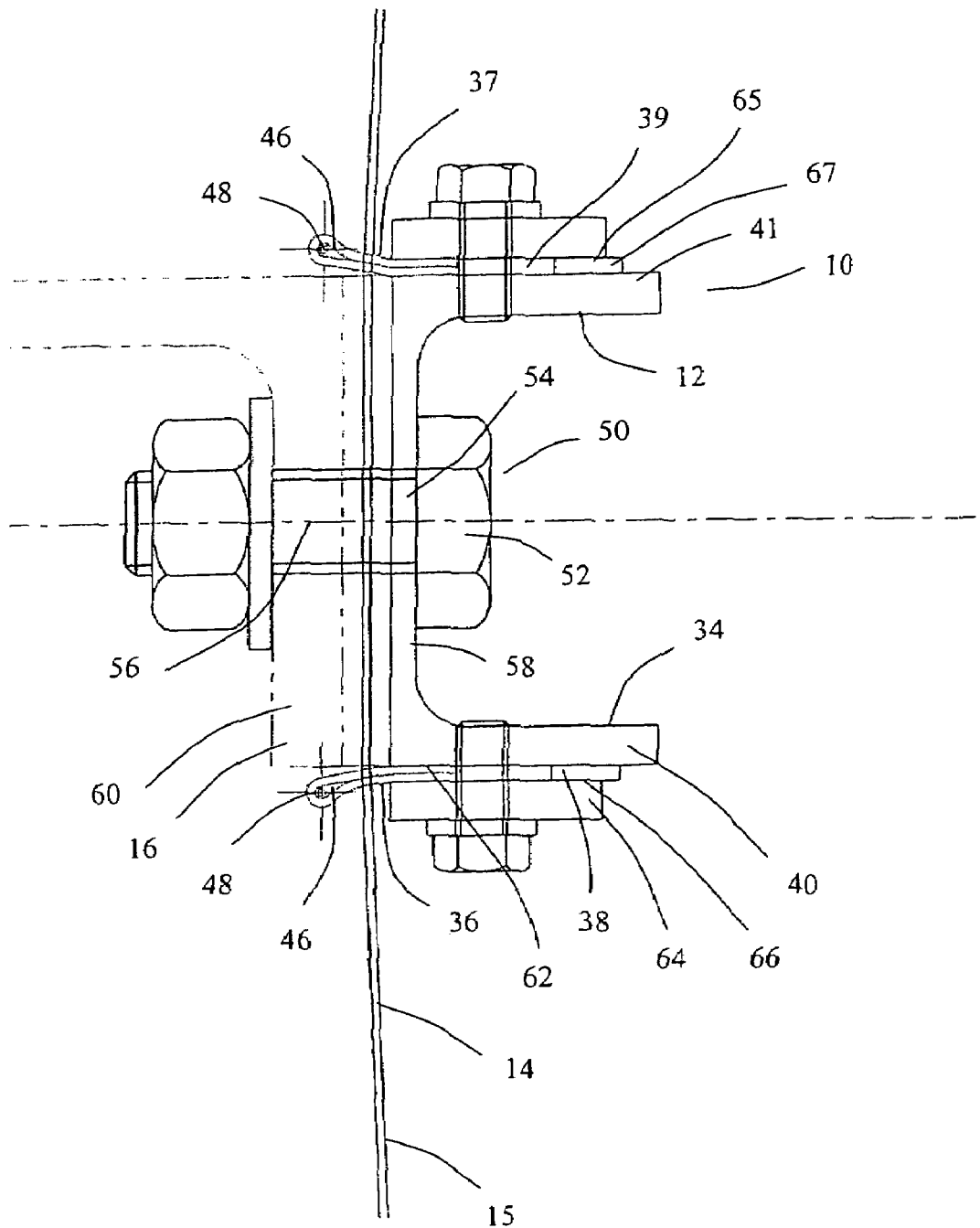
FIG. 1 is a side elevation detailed view of a retention means in accordance with a preferred embodiment of the present invention.
Figure 2:
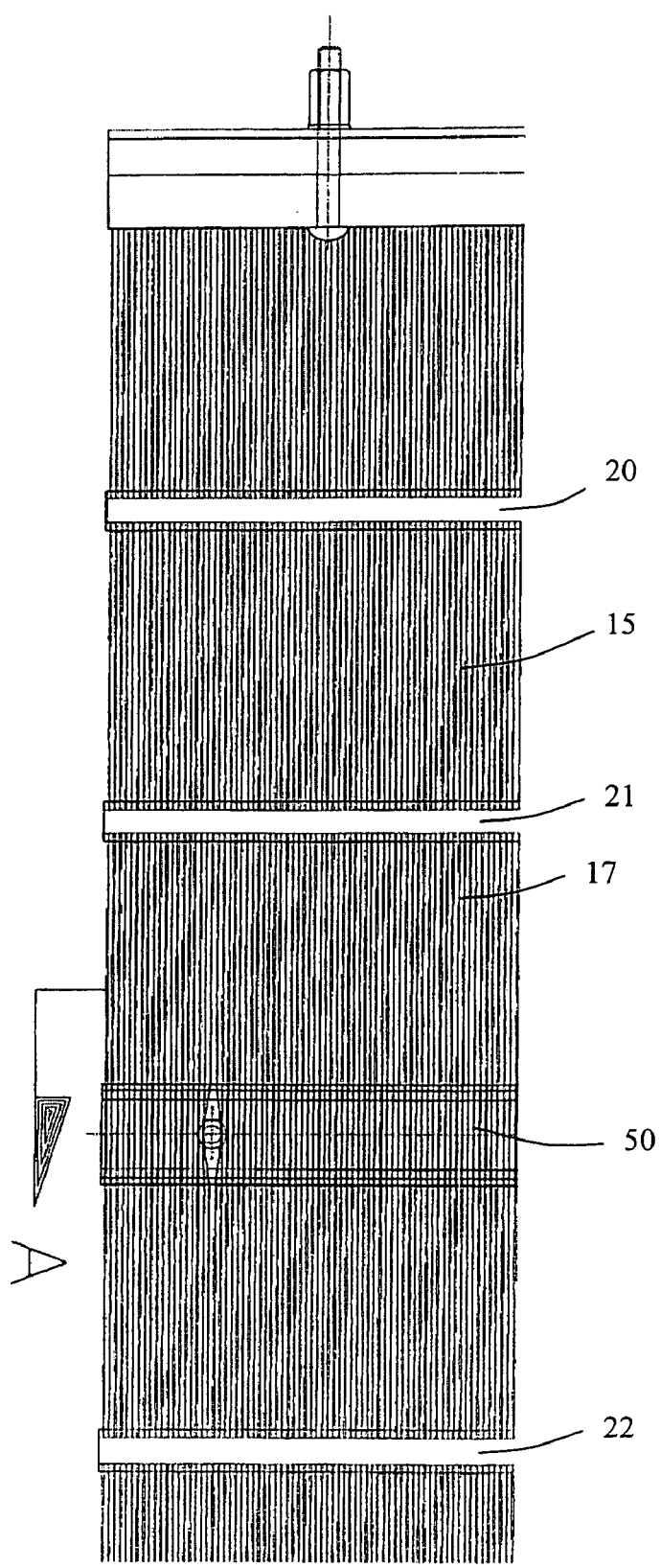
FIG. 2 is a plane view of a preferred embodiment of retention means according to the present invention, installed on a harp screen.
Figure 3:
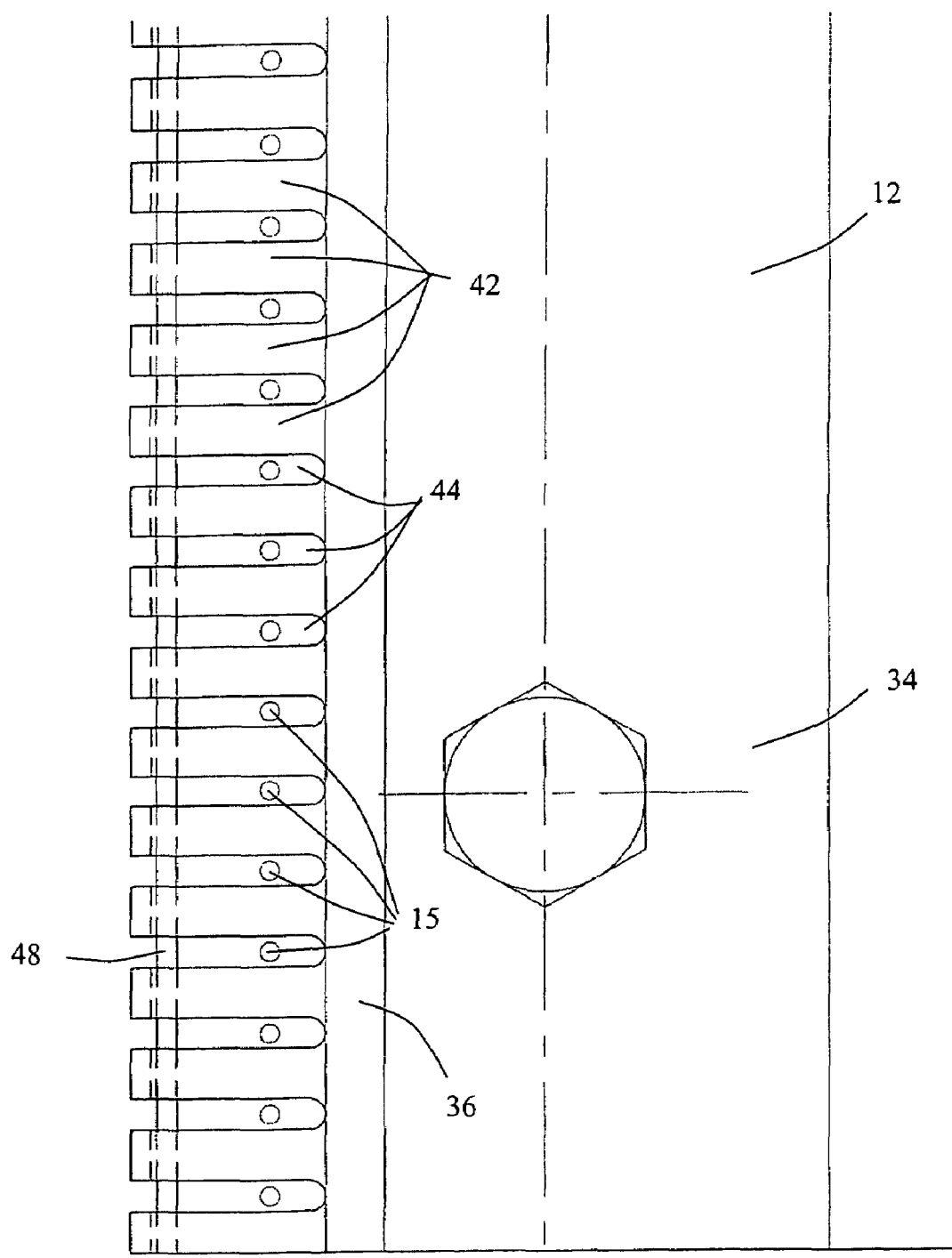
FIG. 3 is a front elevation view of a preferred embodiment of retaining device according to the present invention.

Referring to the drawings there is shown a retention means generally indicated at 10, the retention means including a clamp 12 for clamping at least a portion of filter elements 14 to intermediate frame member 16 when installed.

The retention means 10 is suitable for use with a filter apparatus (not shown), the filter apparatus having a main frame 18 and an intermediate frame member 16. The actual filtering component 15 is in the form of a filter or harp screen 17, having a plurality of filter elements 14 arranged parallel with one another and spaced apart at selected distances by being inserted between teeth or comb members 20, 21 and 22. Each filter element 14 is mounted and gripped in end mount 24, at each end of the filter elements 14. The end mounts are mounted onto side frame members 18 of the filter apparatus, and a selected amount of tension is applied to those filter elements 14 by side clamps 26. When activated, the filter machine vibrates the harp or filter screen. 17 thus encouraging the passage of filter material (not shown) through the harp or filter screen 17.

Figure 4:
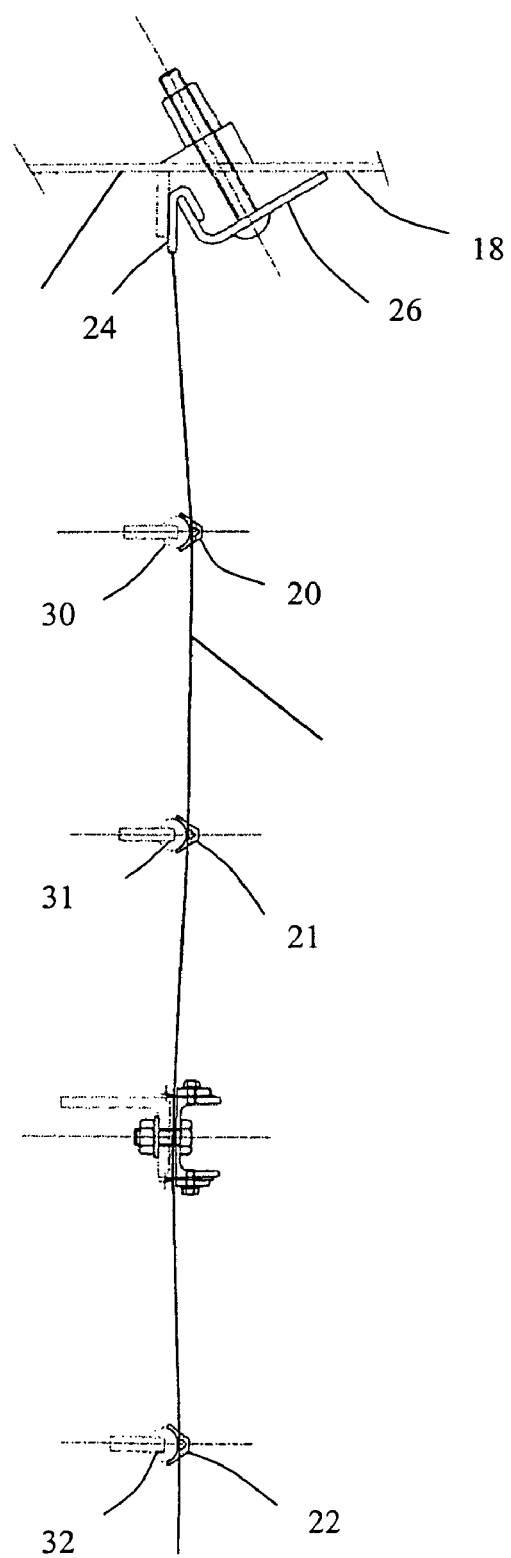
FIG. 4 is a side elevation view of a preferred embodiment of retention device according to the present invention, installed on a harp screen and in a filter machine.
Figure 5:
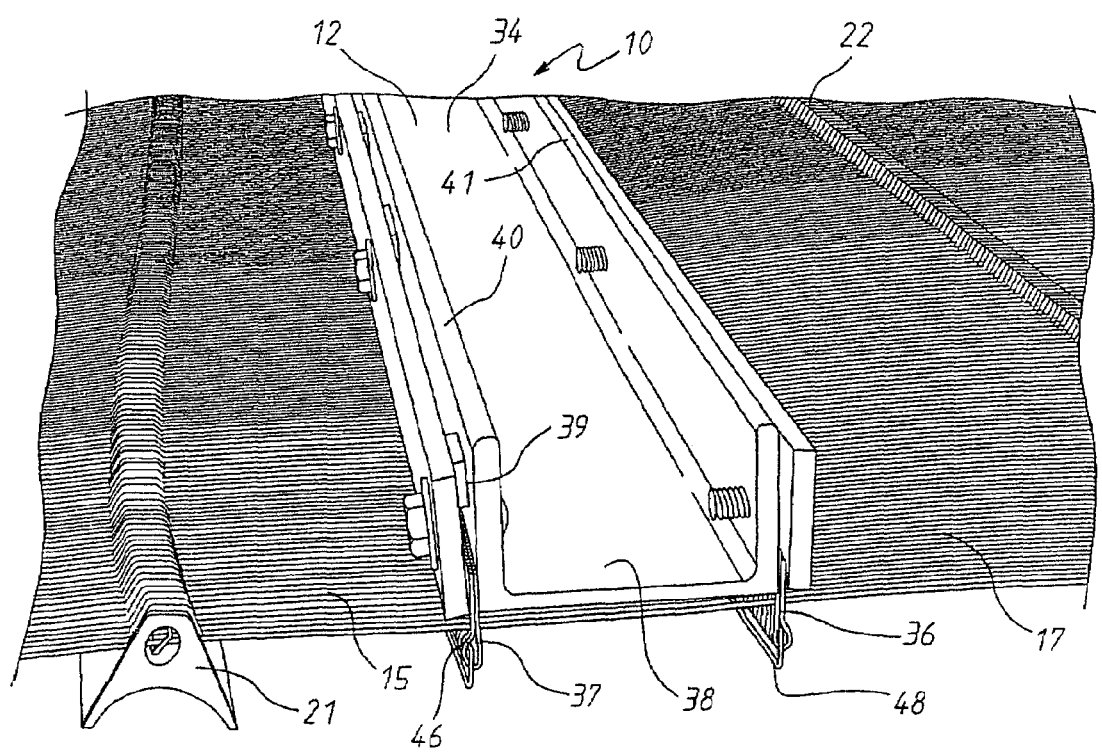
FIG. 5 is a perspective view by photograph of a harp screen with retention device installed, neither device installed on a filter machine.
Figure 6:
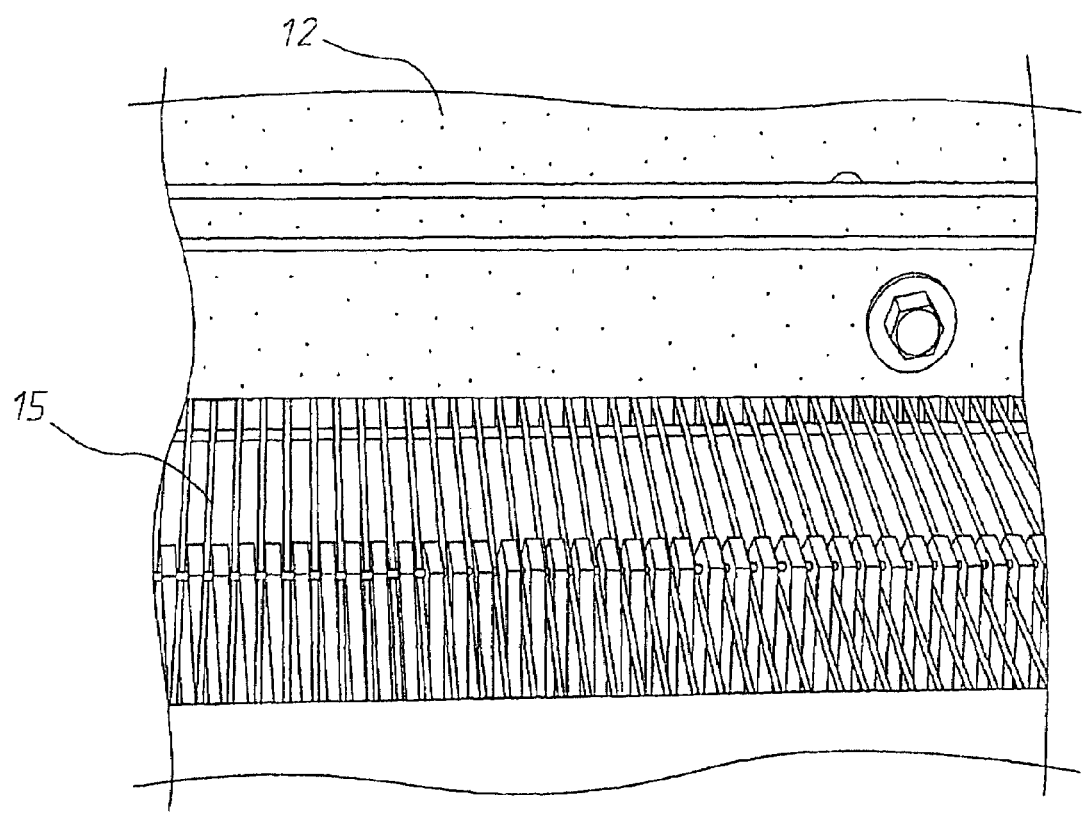
FIG. 6 is a perspective view by photograph of a harp screen and retention device showing comb and comb supports maintaining even spacing between filter elements.

When installed, and before the retention device 10 is applied, the filter screen 17, in side elevation view (shown in FIG. 4) forms an arch between end mount 24 because of elevated comb supports 30, 31 and 32 (others not shown) in order to assist flow of filtered material. When the retention device 10 is installed, a double archway is provided, facilitating greater throughput and greater efficiency of filtering.

The clamp 12 includes an elongate clamping element 34 disposed perpendicular to the filter elements 15 and in the plane of the screen 17 in use. A comb 36 and 37 are each disposed when assembled on comb mounting regions 38 and 39, the comb mounting regions being spaced apart from one another and mounted on opposed outer walls 40 and 41 respectively of the elongate clamp element 34.

The combs 36 and 37, in the form shown, include a plurality of comb teeth 42, spaced apart at selected distances, so as to provide a recess 44 between adjacent teeth 42 for receiving a portion of filter element 15 and spacing each filter element 15 a selected distance from each other filter element 15.

A bight 46 is provided, disposed within each comb tooth 42. The bight is in the form of a transverse through aperture in the end of each tooth 42, for the purpose of receiving and retaining a filter element retaining rod 48.

The comb mounting regions 38 and 39 are spaced apart and the clamp element disposed across the filter screen 17 so that a neutral region 50 is provided. Within the neutral region 50, the relative spacing between adjacent filter elements 15 may be adjusted so as to allow for a fastener 52 to be inserted into a fixing aperture 54 in both a base wall 58 of clamp element 34 and an upper wall 60 of the intermediate frame member of the filter apparatus.

The comb 36 includes a comb trunk 62, which is integral with the teeth 42 which extend therefrom. A comb clamp 64 and 65 is provided on the comb mounting regions 38 and 39 in the form of a flat plate 66 and 67 with fasteners and cooperating apertures and the comb 36 is mounted so that finger ends having the bights 46 extend below the plane of the harp screen 17 for the purpose of facilitating clamping and good retention of the filter elements 15.

To assemble, the harp screen 17 including its mountings 24 are loaded into vibrating filter machine frame elements 18.

Tension is applied by the clamp devices 26 so that the filter elements 15 are substantially tensioned and their relative spacings between one another are not easily varied.

The combs 20, 21 and 22 are engaged with comb mounts 30, 31 and 32 such that a slight arch is provided in the harp screen. The retention device 10 is then installed and the filter elements 15 in the neutral region 50 are manipulated and moved aside so that fastener 52 may enter appropriate aligned holes 54 and 56 in, respectively the base wall 58 of the clamp member 34 and upper wall 60 of intermediate frame member. During this manipulation of the filter elements within neutral region 50, the spacing between the elements 15 in all regions outside the neutral region are unaffected. A double arching is also formed in the screen 17. Furthermore, the retention device 10 facilitates the reduction of tension required in the screen 17, so as to reduce stress in the filter element rods 15, and reducing fatigue stress and extending fatigue life of screen 17.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The claims defining the invention are as follows:

1. A retention device for use with a filter apparatus, the filter apparatus having:
   a main frame and an intermediate frame member; a plurality of parallel filter elements in a filter zone being spaced from one another at a selected distance and forming a filter screen known as a harp screen, the filter screen mounted to the main frame, wherein the retention device includes:
   a clamp, when in use, disposed at an intermediate portion of the filter elements for clamping at least a clamped portion of the filter elements to the intermediate frame member;
   the arrangement being such that a neutral region is provided adjacent or within the clamped portion of the filter elements, the neutral region being such that the filter elements may be manipulated within that region, and their relative spacing varied, within that region, without affecting spacing between filter elements outside the neutral region.

2. A retention means as claimed in claim 1 wherein the clamp includes an elongate clamping element disposed perpendicular to the filter elements and in the plane of the harp screen in order to clamp the clamped portion of each filter element at an intermediate region thereof.

3. A retention means as claimed in claim 1 wherein the neutral region includes one or more combs operatively connected to the clamp for spacing adjacent filter elements apart from one another by the selected distance.

4. A retention means as claimed in claim 3 wherein the or each comb is mounted on the clamp at one or more respective comb mounting regions.

5. A retention means as claimed in claim 1 wherein the neutral region is provided by a clamping region and/or two spaced-apart combs, each comb element including a plurality of comb teeth and receiving apertures between adjacent comb teeth, each aperture for receiving a portion of a respective filter element.

6. A retention means as claimed in claim 3 wherein the or each comb element includes a filter element retaining device for retaining the received portion of each filter element.

7. A retention means as claimed in claim 3 wherein the or each comb element includes one or more bights, in which the filter element retaining device is disposed in use.

8. A retention means as claimed in claim 7 wherein the or each bight is transversely disposed across each comb tooth, the or each bight being in the form of a through aperture adjacent the end of each comb tooth and parallel with a longitudinal axis of the comb element.

9. A retention means as claimed in claim 5 wherein each comb tooth includes a flat sheet of steel or suitable plastic, folded so as to provide the bight, and the comb tooth is connected to and retained by a comb trunk.

10. A retention means as claimed in claim 9 wherein the teeth and trunk are integral.

11. A retention means as claimed in claim 1 wherein clamping to the intermediate frame member is achieved by one or more fasteners, passing through aligned holes in the clamp element and intermediate clamp member.

12. A retention means as claimed in claim 1 wherein, to assemble, the filter elements are moved aside in the neutral region to allow a bolt to pass through the clamp elements and into the intermediate frame member.

13. A retention means as claimed in claim 10 wherein a comb clamp is provided to mount the or each comb, each clamp mounted on a side face of the clamp element, the comb clamp including a broad flat plate element for holding the comb trunk against the side wall, with through apertures for receiving a fastener.

14. A retention device for use with a filter apparatus having a main frame and an intermediate frame member, a plurality of filter elements in a filter zone being spaced from one another at a selected distance and mounted to the main frame, comprising;
    a clamp disposed at an intermediate portion of the filter elements for clamping at least a portion of the filter elements to the intermediate frame member such that a neutral region is provided, the neutral region being such that the filter elements may have their relative spacing varied, within the neutral region, without affecting their relative spacing outside the neutral region.

15. A retention device as claimed in claim 14 wherein the clamp includes an elongate clamping element disposed perpendicular to the filter elements in order to clamp the filter elements at an intermediate region thereof.

16. A retention device as claimed in claim 15 wherein the neutral region includes one or more combs operatively connected to the clamp for spacing adjacent filter elements apart from one another by the selected distance.

17. A retention device as claimed in claim 16 wherein the one or more combs is mounted on the clamp at one or more respective comb mounting regions.

* * * * *